United States Patent
Alcantara et al.

(10) Patent No.: US 10,338,832 B2
(45) Date of Patent: *Jul. 2, 2019

(54) POWER EFFICIENT METHOD AND SYSTEM FOR EXECUTING HOST DATA PROCESSING TASKS DURING DATA RETENTION OPERATIONS IN A STORAGE DEVICE

(71) Applicant: NGD Systems, Inc., Irvine, CA (US)

(72) Inventors: Joao Alcantara, Irvine, CA (US); Ricardo Cassia, Rancho Santa Margarita, CA (US); Vincent Lazo, San Diego, CA (US); Kamyar Souri, San Jose, CA (US)

(73) Assignee: NGD Systems, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/694,521

(22) Filed: Sep. 1, 2017

(65) Prior Publication Data

US 2018/0059972 A1   Mar. 1, 2018

Related U.S. Application Data

(63) Continuation of application No. 15/260,188, filed on Sep. 8, 2016, now Pat. No. 9,753,661, which is a continuation-in-part of application No. 14/816,981, filed on Aug. 3, 2015.

(60) Provisional application No. 62/034,055, filed on Aug. 6, 2014.

(51) Int. Cl.
*G06F 12/00* (2006.01)
*G06F 3/06* (2006.01)
*G06F 1/3209* (2019.01)
*G06F 1/3234* (2019.01)

(52) U.S. Cl.
CPC .......... *G06F 3/0619* (2013.01); *G06F 1/3209* (2013.01); *G06F 1/3268* (2013.01); *G06F 3/061* (2013.01); *G06F 3/0655* (2013.01); *G06F 3/0679* (2013.01); *Y02D 10/154* (2018.01)

(58) Field of Classification Search
None
See application file for complete search history.

(56) References Cited

U.S. PATENT DOCUMENTS

| 8,819,335 | B1 | 8/2014 | Salessi et al. |
| 8,843,700 | B1 | 9/2014 | Salessi et al. |
| 9,753,661 | B2* | 9/2017 | Alcantara ............. G06F 1/3209 |
| 2005/0185496 | A1* | 8/2005 | Kaler .................... G06F 3/0619 365/230.06 |

(Continued)

*Primary Examiner* — Daniel D Tsui
(74) *Attorney, Agent, or Firm* — Lewis Roca Rothgerber Christie LLP

(57) ABSTRACT

A system and method for combining the execution of a query with other operations, such as a data retention scan, in a storage device, when the execution of the query is not time-sensitive. The storage device may be connected to a host, and may operate during intervals of time in a power save mode. When a query is received by the host that is not time-sensitive, the query may be stored in the host or in the storage device until such time as the device would otherwise return to a normal operating mode, and then the query may be executed. Such delayed execution may enable the sharing of read operations for the query with read operations used, for example, for the execution of other queries or for a data retention scan.

12 Claims, 6 Drawing Sheets

(56) References Cited

U.S. PATENT DOCUMENTS

| | | | |
|---|---|---|---|
| 2008/0239851 A1* | 10/2008 | Lin .................... | G11C 16/3418 |
| | | | 365/222 |
| 2013/0060981 A1* | 3/2013 | Horn ....................... | G06F 13/16 |
| | | | 710/107 |
| 2015/0134883 A1* | 5/2015 | Lin ....................... | G06F 3/0679 |
| | | | 711/103 |

* cited by examiner

POWER EFFICIENT METHOD AND SYSTEM FOR EXECUTING HOST DATA PROCESSING TASKS DURING DATA RETENTION OPERATIONS IN A STORAGE DEVICE

CROSS-REFERENCE TO RELATED APPLICATION(S)

The present application is a continuation of U.S. patent application Ser. No. 15/260,188, filed Sep. 8, 2016, entitled "POWER EFFICIENT METHOD AND SYSTEM FOR EXECUTING HOST DATA PROCESSING TASKS DURING DATA RETENTION OPERATIONS IN A STORAGE DEVICE", which is a continuation-in-part of U.S. patent application Ser. No. 14/816,981, filed Aug. 3, 2015, entitled "POWER EFFICIENT METHOD AND SYSTEM FOR EXECUTING HOST DATA PROCESSING TASKS DURING DATA RETENTION OPERATIONS IN A STORAGE DEVICE", which claims priority to and the benefit of U.S. Provisional Application No. 62/034,055, filed Aug. 6, 2014, entitled "POWER EFFICIENT METHOD AND SYSTEM FOR EXECUTING HOST DATA PROCESSING TASKS DURING DATA RETENTION OPERATIONS IN A STORAGE DEVICE", the entire contents of each of which are incorporated herein by reference.

The present application is related to U.S. Pat. No. 8,843,700, entitled "POWER EFFICIENT METHOD FOR COLD STORAGE DATA RETENTION MANAGEMENT", the entire content of which is incorporated herein by reference.

FIELD

One or more aspects of embodiments according to the present invention relate to operation of a storage device, and more particularly to efficient execution of queries that may not be time-sensitive.

BACKGROUND

Every day, several quintillion bytes of data may be created around the world. These data may come from various sources, e.g., posts to social media sites, digital pictures and videos, purchase transaction records, bank transactions, sensors used to gather data and intelligence (like weather information), cell phone Global Positioning System (GPS) signals, and many others. This type of data and its accumulation may be referred to as "big data." This large amount of data eventually may be stored and maintained in storage nodes, such as hard disk drives (HDDs), solid-state storage drives (SSDs), or the like, and these may reside on networks or on storage accessible via the Internet, which may be referred to as the "cloud." In some cases the data is not accessed very frequently but it may be advantageous for it to be available at any time with reduced or minimal delay. For example, the data may be write once, read many (WORM) data, such as data posted to social media web sites, or video media posted by users on public video sharing sites.

Some queries, or requests for data from storage nodes may be time-sensitive (i.e., it may be advantageous for data to be delivered quickly in response to such requests) and some may not be time-sensitive (i.e., there may be little advantage to delivering the data quickly. Retrieving data may in some circumstances involve causing a storage device to transition from a power save mode to a normal mode of operation; such transitions may be avoided or postponed without significant disadvantage when the request for data is not time-sensitive.

Thus, there is a need for a system and method of executing queries that avoids or postpones transitions from power save mode for queries that are not time-sensitive.

SUMMARY

Aspects of embodiments of the present disclosure are directed toward a system and method for combining the execution of a query with other operations, such as a data retention scan, in a storage device, when the execution of the query is not time-sensitive. The storage device may be connected to a host, and may operate during intervals of time in a power save mode. When a query is received by the host that is not time-sensitive, the query may be stored in the host or in the storage device until such time as the device would otherwise return to a normal operating mode, and then the query may be executed. Such delayed execution may enable the sharing of read operations for the query with read operations used, for example, for the execution of other queries or for a data retention scan.

According to an embodiment of the present invention there is provided a solid state drive, including: a controller; a nonvolatile memory connected to the controller; and a host interface connected to the controller, the solid state drive being configured to: receive a query through the host interface; and execute the query, the executing of the query including executing a plurality of read operations, the executing of the read operations including: determining whether the query is time-sensitive; and when the query is not time-sensitive, executing the read operations with a data retention scan.

In one embodiment, the determining of whether the query is time-sensitive includes determining whether the query includes a flag identifying the query as time-sensitive.

In one embodiment, the determining of whether the query is time-sensitive includes determining whether the query includes a requested completion interval less than a threshold interval.

In one embodiment, the threshold interval is a time interval before a next scheduled data retention scan, plus a predicted execution time of the query.

In one embodiment, the executing the read operations with the data retention scan includes: performing the read operations; and when the data retention scan involves performing additional read operations on physical pages not read during read operations corresponding to the query, performing the additional read operations.

In one embodiment, the controller is configured to: receive the query through the host interface; and execute the query.

According to an embodiment of the present invention there is provided a system, including: a host; and a solid state drive, the system being configured to: receive a query; and execute the query the executing of the query including executing a plurality of read operations, the executing of the read operations including: determining whether the query is time-sensitive; and when the query is not time-sensitive, executing the read operations with a data retention scan.

In one embodiment, the determining whether the query is time-sensitive includes determining, by the host, whether the query is time-sensitive.

In one embodiment, the determining whether the query is time-sensitive includes determining whether the query includes a requested completion interval less than a threshold interval.

In one embodiment, the threshold interval is a time interval before a next scheduled data retention scan, plus a predicted execution time of the query.

In one embodiment, the executing of the read operations with the data retention scan includes: storing the query in the host until a scheduled start time of a next scheduled data retention scan; and sending, by the host, a query corresponding to the read operations, to the solid state drive.

In one embodiment, the executing of the read operations with the data retention scan includes: first, storing the query in the solid state drive until a scheduled start time of a next scheduled data retention scan; and second, executing, by the solid state drive, the plurality of read operations.

According to an embodiment of the present invention there is provided a method for operating a solid state drive connected to a host, the solid state drive including nonvolatile memory and an environmental data logging circuit and a source of a battery power, the method including: transitioning the solid state drive to a power save mode; receiving, by the host, a query; executing, by the solid state drive, a plurality of read operations corresponding to the query, the executing of the plurality of read operations including: determining whether the query is time-sensitive; and when the query is not time-sensitive, executing the read operations with a data retention scan.

In one embodiment, the determining of whether the query is time-sensitive includes determining, by the host, whether the query is time-sensitive.

In one embodiment, the determining of whether the query is time-sensitive includes determining, by the solid state drive, whether the query is time-sensitive.

In one embodiment, the determining of whether the query is time-sensitive includes determining whether the query includes a flag identifying the query as time-sensitive.

In one embodiment, the determining whether the query is time-sensitive includes determining whether the query includes a requested completion interval less than a threshold interval.

In one embodiment, the threshold interval is a time interval before a next scheduled data retention scan, plus a predicted execution time of the query.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for executing host data processing tasks during data retention operations in a storage device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
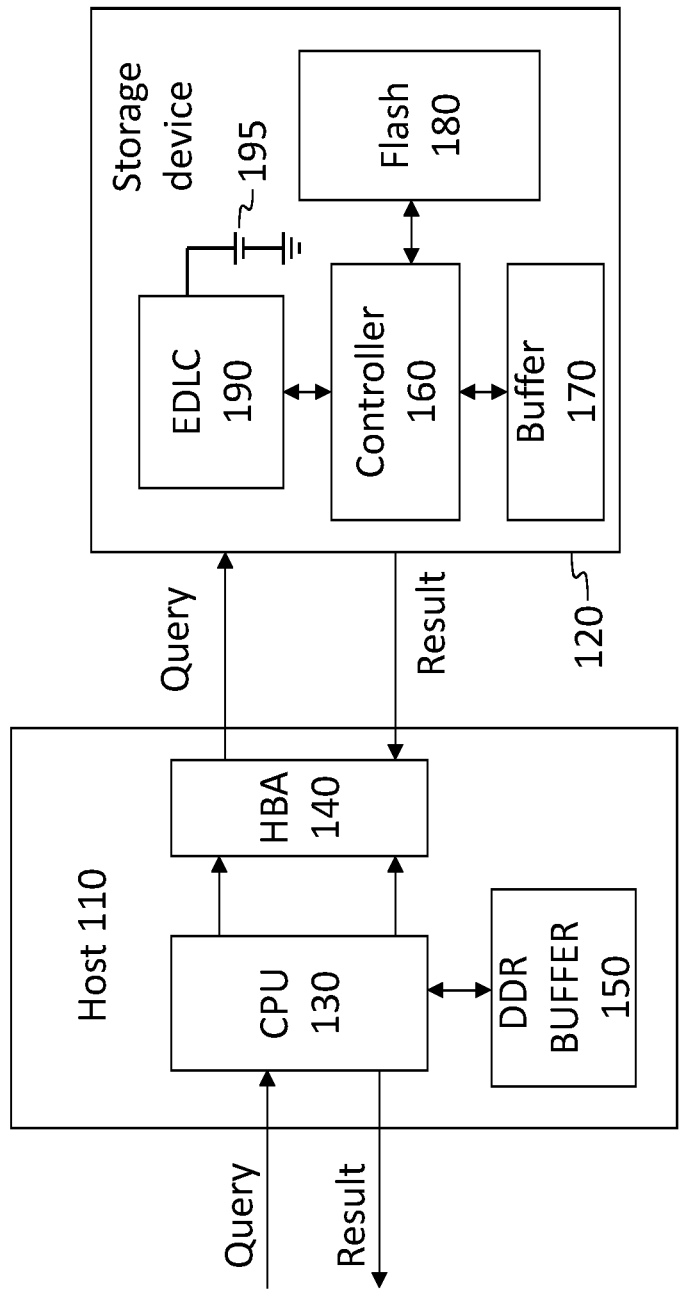
FIG. 1A is a block diagram of a host and storage device, according to an embodiment of the present invention.
Figure 1B:
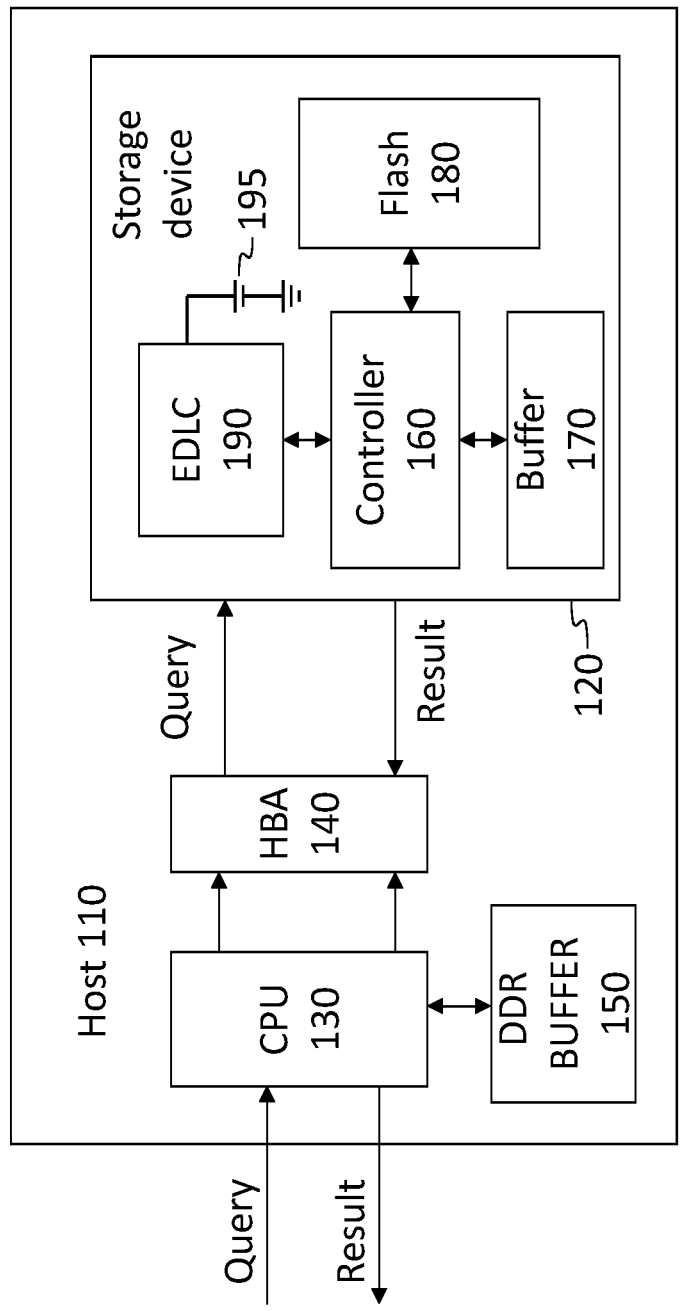
FIG. 1B is a block diagram of a host and storage device, according to an embodiment of the present invention.

Referring to FIG. 1A, in some embodiments a storage device 120 may, in operation, be a component of (or be connected to), and provide storage for, a host 110, e.g., a server or other computer. The storage device 120 may be considered to be a component of the host 110 (as illustrated in FIG. 1B) or a separate (e.g., external) component connected to the host (as illustrated in FIG. 1A). The host interface (including the host connector, and the communications protocols) between the storage device 120 and the host 110 may be, for example, a storage interface such as Serial Advanced Technology Attachment (SATA), Fibre Channel, Small Computer System Interface (SCSI), Serial Attached SCSI (SAS), Peripheral Component Interconnect Express (PCIe), Non Volatile Memory Express (NVMe), SCSI over PCIe, or a more general-purpose interface such as Ethernet or Universal Serial Bus (USB). In some embodiments, the storage device 120 may conform to a 3.5 inch hard drive form-factor (or "large form factor" (LFF)) standard, or it may conform to a 2.5 inch hard drive form-factor (or small form factor (SFF)) standard. In other embodiments the storage device 120 may conform to a standard PCIe card form factor, e.g., a full-height, full length (FH-FL) card outline, or a full-height, half length (FH-HL) outline. The storage device 120 may be a solid state drive (SSD). The host 110 may be a cloud-based server (e.g., part of a cluster of servers executing map-reduce functions) that receives queries, e.g., from a master node, and translates the received server-level queries into storage device queries that it sends to the storage device 120. In one embodiment, the storage device 120 may comprise pins (or a socket) to mate with a corresponding socket (or pins) in the host 110 to establish an electrical and physical connection with, e.g., the CPU 130. In another embodiment, the storage device 120 includes a wireless transceiver, and the host 110 and the storage device 120 are in wireless communication with each other. The host 110 and the storage device 120 may be separately housed from each other, or contained in the same housing.

In operation, the host 110 may receive (e.g., from a master node) a query (an "original query"), described by map and reduce functions, for example, which may entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the host 110 may send the original query, or one or more queries related to the original query, to the storage device 120 for execution in the storage device 120. The storage device 120 receives the one or more queries, and executes them, returning one or more query results to the host 110. The execution of the query may involve executing one or more read operations on the nonvolatile memory 180. The host 110 may then process the query results received from the storage device 120 and return a result, e.g., to the master node. In some circumstances, the execution of a query may include both read operations and write operations, the write operations being used, for example, to write intermediate results to the nonvolatile memory 180.

The host 110 may include a central processing unit 130 that is connected to the storage device 120 through a host bus adapter (HBA) 140, and a buffer 150 that may include double data rate (DDR) memory. The storage device 120 may include a controller 160, volatile memory 170 (which may be referred to as "buffer" memory and may include (e.g., be composed of) dynamic read only memory (DRAM)). The storage device 120 may further include a nonvolatile memory 180 (which may be flash memory) and an environmental data logging circuit (EDLC) 190.

Data stored in the nonvolatile memory 180 may be stored as charge on a floating gate in each memory cell (e.g., each bit) of the nonvolatile memory 180, and the charge may leak away from the floating gate over time. As a result, data stored in any physical page of the nonvolatile memory 180 may have a certain expected data life, i.e., a time interval during which the data in the physical page is expected to remain reliable (e.g., during which the raw bit error rate is expected to remain below 0.0010 or 0.0001). The rate at which the charge stored on each floating gate changes may be a function of various factors, including, e.g., the number of program and erase cycles to which a memory cell has been subjected (with the rate of change of charge generally being higher for cells having been subjected to a larger number program and erase cycles) and on the temperature of the nonvolatile memory 180 (with the rate of change of charge generally being higher at higher temperatures). The expected data life may be calculated using a model (e.g., a physics-based model or an empirical model) of the nonvolatile memory 180. The controller 160 may implement forward error correction (FEC) coding to correct bit errors. This process may involve encoding data, using a forward error correction code encoder, prior to storing the data in the nonvolatile memory 180, and decoding data read from the nonvolatile memory 180, with an error correction code decoder. The error correction code decoder may generate, in addition to the decoded data (with bit errors corrected), a count of the number of bit errors corrected. The forward error correction coding may fail to correct bit errors if they exceed a threshold proportion of the data stored; in this case the stored data may be referred to as corrupted. The error correction code encoder and the error correction code decoder may each be implemented as software executing on the controller 160 and/or as special-purpose hardware, in the controller 160 or in one or more separate circuits.

The nonvolatile memory 180 may include a plurality of physical blocks of flash memory, each containing a plurality of physical pages of flash memory. A plurality of flash channel interfaces may connect the controller 160 to memory devices (e.g., flash memory devices, which may be integrated circuits or packages each containing one or more integrated circuits) in the nonvolatile memory 180. Physical blocks may be the smallest increment in which the nonvolatile memory 180 may be erasable, and physical pages may be the smallest increment in which the nonvolatile memory 180 may be writeable (or programmable). As such, all of the data in each physical page in the nonvolatile memory 180 may be expected to have a similar history and a similar expected data life.

To accommodate limitations on minimum erasing and programming increments while allowing the central processing unit 130 to access smaller increments of storage, the storage device 120 may implement a mapping from logical page address to physical page addresses, in a layer referred to as a flash translation layer. For example, if the central processing unit 130 sends a command to the storage device 120 to update the value of a stored data word, the controller 160 may write the new value of the data word to a different page in the nonvolatile memory 180, mark as invalid the storage location at which the data word was previously stored, and update the mapping in the flash translation layer.

To conserve power, the storage device 120 may operate during certain intervals of time in a power save mode, e.g., a sleep mode, in which some operations are not performed, to save power. For example, in a sleep mode, read, write, and erase operations to the nonvolatile memory 180 may be suspended, to save power. Several different power save modes may be available; operating in a power save mode may involve one or more of the following: suspending accesses to the nonvolatile memory 180, suspending operation of the central processing unit 130, shutting off all external power to the storage device 120 (which may include a temporary power source 195, such as battery or capacitor, to supply power for a reduced level of activity), or shutting off the storage device 120 entirely (which may be the result of shutting off all external power to the storage device 120, if the storage device 120 does not include a temporary power source 195).

When the age of the data in a physical page, which is measured from the time the data are written to the physical page, exceeds the expected data life, the data item may be said to expire and the data may be unreliable, i.e., at high risk of being corrupted. As used herein, the remaining data life of the data in a physical page is the data life of the data in the physical page less the age of the data in the physical page. The data life may be different for different physical pages of the nonvolatile memory 180, and it may depend on the number of program and erase cycles that have been performed on the physical page, and on the temperature history of the nonvolatile memory 180. As used herein, the remaining data life of a physical page is the data life of the data in the physical page less the age of the data in the physical page.

To avoid loss or corruption of data, the controller 160 may periodically scan some or all of the physical pages of the nonvolatile memory 180 to assess the condition of the data. This process may be referred to as a data retention scan. For example, the controller 160 may read the data, and the error correction code decoder may decode the data, and the controller 160 may generate a measure of the condition of the data, such as the raw bit error rate (e.g., the ratio of number of bit errors to the number of bits read). This measure of the condition of the data may be used to determine whether to refresh the data in any physical page, e.g., to copy the data to another physical page, and to mark the original physical page as invalid. The data retention scan may result, for example, in a raw bit error rate table, listing all of the physical pages scanned and the raw bit error rate measured in each. The controller 160 may combine the outcome of the data retention scan with other considerations, e.g., the number of program and erase cycles to which each physical page has been subjected (which may provide an indication as to the rate at which the condition of the data may be expected to degrade in the respective physical pages), and determine whether to refresh the data in any of the physical pages. The controller 160 may then perform the refresh operations. Some of these acts may involve transitioning out of a power save mode into a full power mode (i.e., normal operating mode, in which the storage device 120 is fully operational), or transitioning between various suitable power save modes, e.g., by resuming operation of the processor or resuming access operations to the nonvolatile memory 180.

Figure 2:
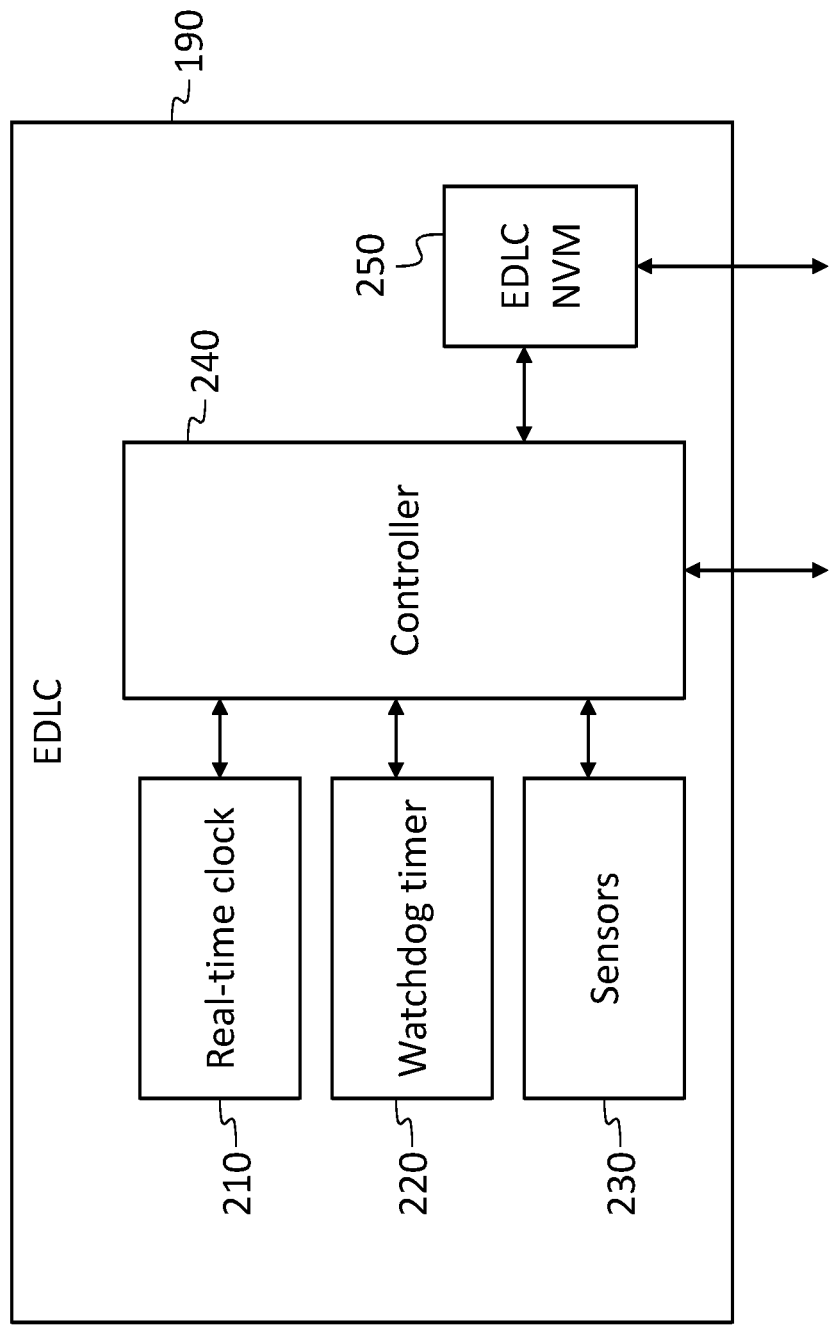
FIG. 2 is a block diagram of an environmental data logging circuit, according to an embodiment of the present invention.

The environmental data logging circuit 190 may log environmental data, e.g., temperature, that may be subsequently be used to determine when to perform a data retention scan or when to refresh the data in a physical page. Referring to FIG. 2, the environmental data logging circuit 190 may include a real-time clock 210, a watchdog timer 220, one or more sensors 230, an environmental data logging circuit controller 240, and an environmental data logging circuit non-volatile memory (EDLC NVM) 250 (which may be separate from the nonvolatile memory 180 of the storage device 120). In operation, the environmental data logging circuit controller 240 may periodically read the sensors 230 and the real-time clock 210 and save time-tagged sensor readings, such as temperature readings, in the environmental data logging circuit non-volatile memory 250. One or both of the environmental data logging circuit controller 240 and the environmental data logging circuit non-volatile memory 250 may be in communication with the controller 160 of the storage device 120. As used herein, "logging" of sensor data refers to making a record including a plurality data values, each data value corresponding to, and being identified with, a sensor measurement performed at a different point in time. A data value may be identified with a point in time as a result of, e.g., being stored with an associated time tag, or of being one of a numbered series of data values corresponding to sensor measurements performed at regular intervals.

Figure 3:
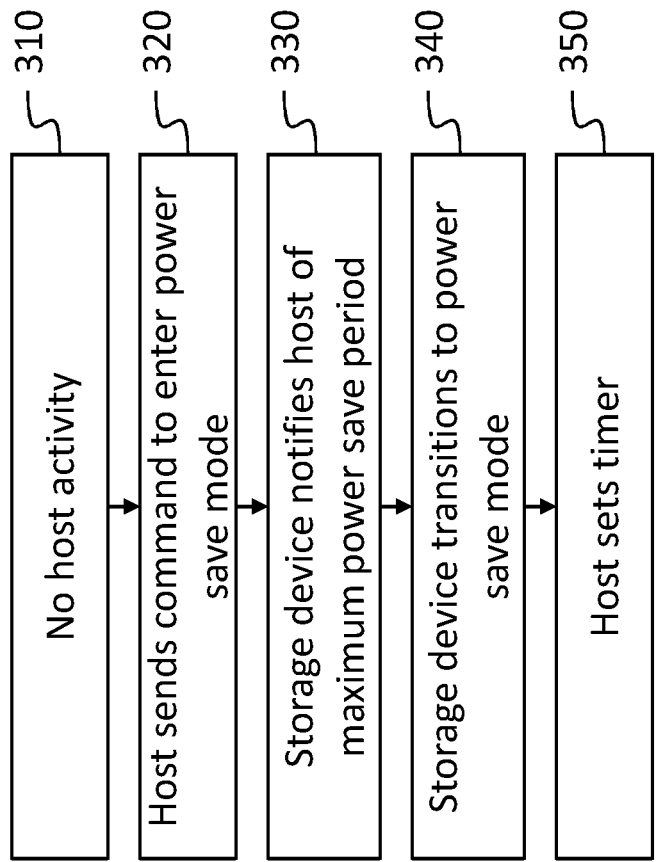
FIG. 3 is a flow chart of a transition to a power save mode, according to an embodiment of the present invention.

In operation, the storage device 120 may operate in a power save mode during intervals of time ("power save mode intervals") when no data retention scan or refresh operation is scheduled, and transition to normal operating mode at the end of each interval to perform a data retention scan and/or one or more refresh operations. In some embodiments, the interval of time may be set at the beginning of each power save mode interval. For example, referring to FIG. 3, during a period of no host activity 310, the host 110 may send the storage device 120, in an act 320, a command to enter power save mode. The storage device 120 may then calculate the maximum allowable length of the power save mode interval and notify the host of this maximum allowable length in an act 330. The maximum allowable length of the power save mode interval may be selected, for example, by calculating the remaining data life of each physical page and selecting the maximum allowable length of the power save mode interval to be less than the smallest remaining data life by an amount that takes into account uncertainties in the remaining data life, e.g., uncertainties due to uncertainties in the environmental conditions that may occur during the power save mode interval.

In an act 340 the storage device 120 then transitions to a power save mode, and in an act 350 the host 110 sets a timer to expire at the end of the power save mode interval. The expiration of the timer may then trigger a return to normal operating mode, followed by, e.g., a data retention scan or one or more refresh operations, to prevent corruption of data. The various acts illustrated in FIG. 3 may, in some embodiments, be performed by either the host 110 or the storage device 120. For example, the storage device 120 may initiate a transition to a power save mode during a period of inactivity, and it may set the timer. The timer may be a hardware or software timer in the host, or it may be a hardware timer (e.g., the watchdog timer 220) in the storage device 120, or a software timer in the storage device 120 if the power save mode enables such a timer to run. The calculating of the maximum allowable length of the power save mode interval may be performed by the host 110 instead of the storage device 120. If the power save mode involves shutting off the storage device 120 entirely and if the storage device 120 lacks a temporary power source 195, then the storage device 120 may be incapable of initiating a return to a normal operating mode of operation, and the host 110 may initiate the return to normal operating mode.

The environmental data logging circuit 190 may provide a log of historical environmental conditions that may be used to calculate or update the expected data life for any physical page prior to the calculation of the maximum allowable length of the power save mode interval. The environmental data logging circuit 190 may be part of the storage device 120 (as illustrated in FIG. 2) or it may be part of the host 110. The environmental data logging circuit 190 may continue operating during operation in power save mode, e.g., if it is part of the host, or if it remains powered up in the storage device 120 (e.g., being part of a dedicated power island in the storage device 120), receiving power from the host 110 or from a temporary power source 195 in the storage device 120. Data logged by the environmental data logging circuit 190 may also be used to update the maximum allowable length of the power save mode interval during the power save mode interval, and the timer setting may be adjusted accordingly, e.g., hastening or delaying the expiration of the timer.

During the power save mode interval, the host 110 may receive (or initiate) queries that may be translated to queries to be executed on the storage device 120. Such queries may be time-sensitive; for example, a query may originate from a user who may be waiting for the query result. When the query is time-sensitive, the host may cause the storage device 120 to return to normal operating mode to perform the query. When the query is not time-sensitive, the host 110 may postpone processing of the query until the end of the power save mode interval. At the end of the power save mode interval, the query may be executed. In some circumstances, executing the query may involve read operations that may involve reading the same physical pages as those that would be read as part of the next data retention scan. In this case, each of these physical pages may be read just once, and the results may be used both to complete the execution of the query and for the data retention scan. In this manner, the power that would otherwise be consumed performing two separate read operations in each of these pages may be saved.

Moreover, if several queries (e.g., several queries that are not time-sensitive) accumulate in the host 110 during the power save mode interval, then to the extent the queries use the same data, read operations may be further reduced, by executing two or more queries in parallel, with the results of each read operation being provided to one or more of the queries. In one embodiment, any queries to be executed are executed first, and as data are read from physical pages, the measured raw bit error rate is stored in the raw bit error rate table. The data retention scan may then avoid re-scanning the physical pages for which entries are already present in the raw bit error rate table. Further, by postponing the processing of one or more queries, the overhead of performing an additional transition to normal operating mode and back to power save mode may be avoided.

Figure 4:
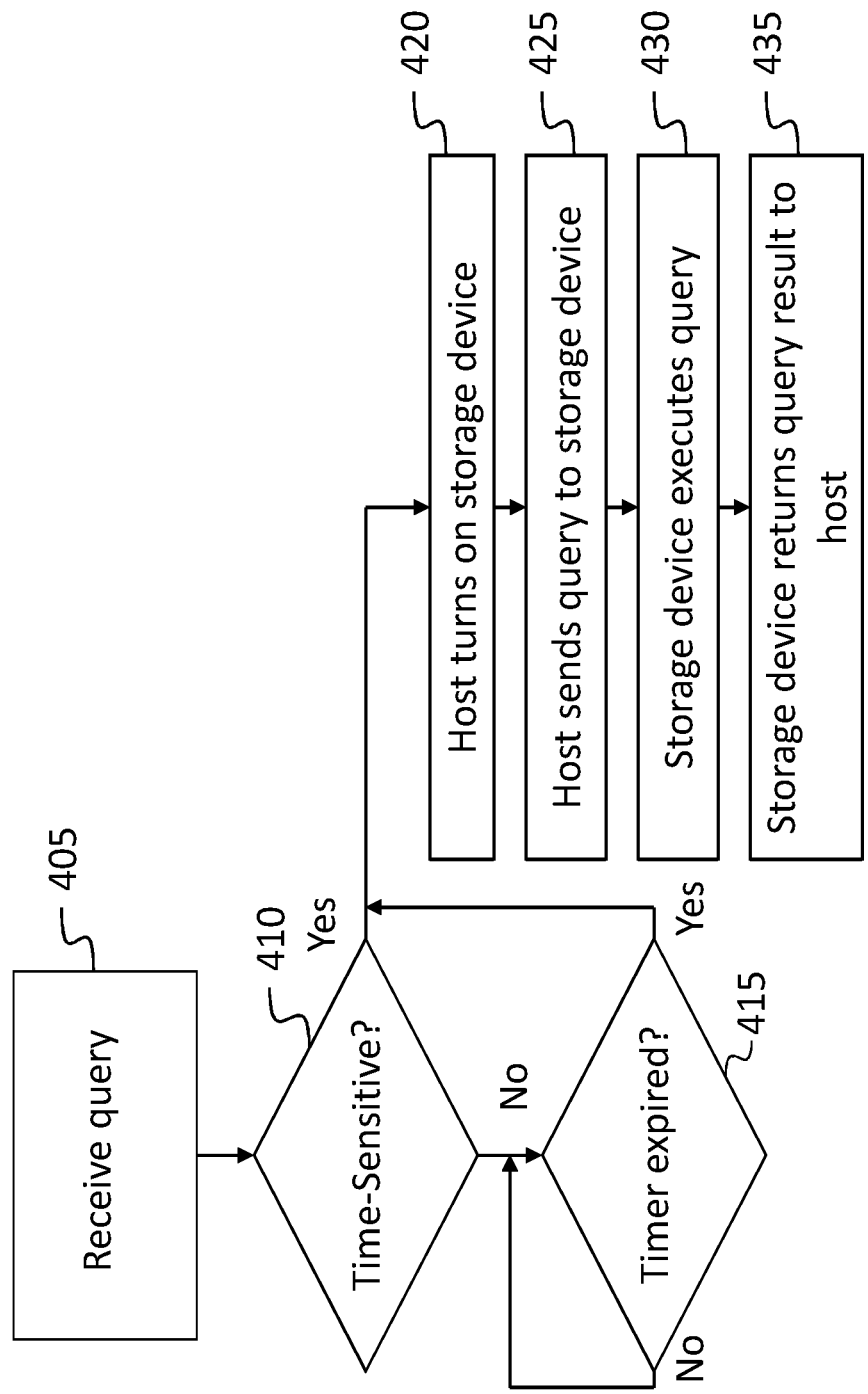
FIG. 4 is a flow chart of execution of a query, according to an embodiment of the present invention.

FIG. 4 shows a flowchart of such a process, according to one embodiment. In an act 405, the host 110 receives a query (e.g., from a master node). In an act 410, the host 110 determines whether the query is time-sensitive; if it is, the host 110 turns on the storage device 120, in an act 420, and sends, in an act 425, the query to the storage device 120. The storage device 120 executes the query in an act 430 and returns the query result to the host 110 in an act 435.

If, in the act 410, the host 110 determines that the query is not time-sensitive, then in an act 415 it waits for the timer to expire, and then proceeds, in acts 420 and 425, to turn on the storage device and send the query, and the storage device 120 executes the query and returns the results in acts 430 and 435.

Figure 5:
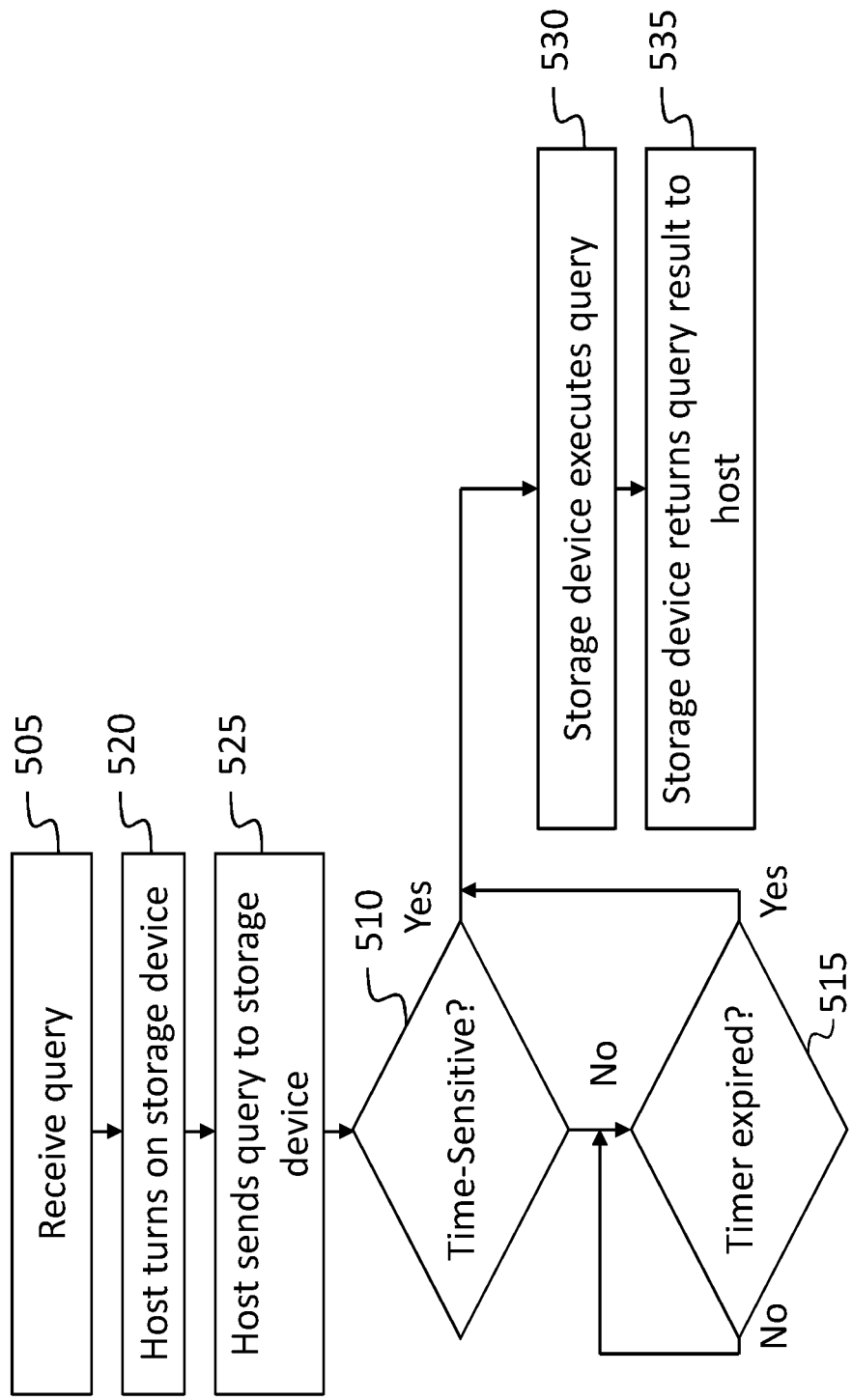
FIG. 5 is a flow chart of execution of a query, according to an embodiment of the present invention.

Pending execution, queries that are not time-sensitive may be stored in host 110 or in the storage device 120, and, in some embodiments, some of the acts performed in FIG. 4 by the host 110 may instead be performed by the storage device 120. For example, referring to FIG. 5, in one embodiment, in an act 505, the host 110 receives a query (e.g., from a master node), and then the host 110 turns on the storage device 120, in an act 520, and sends, in an act 525, the query to the storage device 120. In an act 510, the storage device 120 determines whether the query is time-sensitive; if it is, the storage device 120 executes the query in an act 530 and returns the query result to the host 110 in an act 535. If, in the act 510, the storage device 120 determines that the query is not time-sensitive, then in an act 515 it waits for the timer to expire, and then proceeds to execute the query and returns the results, in acts 530 and 535.

In some embodiments the query may include a flag that indicates whether or not it is time-sensitive, as determined for example by the master node, or by a user who may have initiated the query. In other embodiments whether a query is time-sensitive may be communicated, for example, in the form of a requested completion interval, that may for example be provided by the master node. For example, the master node may specify that a response is requested within five minutes or within ten days. Accordingly, the host 110 may then determine that the query for which a response is requested within five minutes is time-sensitive, and that the query for which a response is requested within ten days is not time-sensitive. In some embodiments a query is classified as time-sensitive when the requested completion interval is sufficiently short that waiting until the timer has expired to begin executing the query will not result in completing the query within the requested completion interval, i.e., when the interval before a next scheduled data retention scan, plus the predicted execution time of the query, exceeds the requested completion interval.

In light of the foregoing, a system and method may be used to combine the execution of a query with other operations, such as a data retention scan, in a storage device 120, when the execution of the query is not time-sensitive. The storage device 120 may be connected to a host 110, and may operate during intervals of time in a power save mode. When a query is received by the host that is not time-sensitive, the query may be stored in the host or in the storage device until such time as the device would otherwise return to a normal operating mode, and then the query may be executed. Such delayed execution may enable the sharing of read operations for the query with read operations used, for example, for the execution of other queries or for a data retention scan.

The terminology employed herein refers to interactions between the storage device 120 and the host 110 as though the storage device 120 is a separate (e.g., external) component connected to the host 110; it will be understood that in embodiments in which the storage device 120 is a component of the host 110, such interactions refer to interactions between the storage device 120 and the remainder of the host 110 (i.e., the portions of the host 110 excluding the storage device 120). It will be understood that where the present disclosure describes actions of the storage device 120, the actions may be executed, in particular, by the controller 160 of the storage device 120.

Various elements of embodiments of the present invention, such as the controller 160, may be, or may include, processing circuits. The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for executing host data processing tasks during data retention operations in a storage device have been specifically described and illustrated herein, many modifications and variations will be apparent to those skilled in the art. Accordingly, it is to be understood that a system and method for executing host data processing tasks during data retention operations in a storage device constructed according to principles of this invention may be embodied other than as specifically described herein. The invention is also defined in the following claims, and equivalents thereof.

What is claimed is:

1. A solid state drive, comprising:
   a controller;
   a nonvolatile memory connected to the controller; and
   a host interface connected to the controller,
   the solid state drive being configured to:
      receive a query through the host interface; and
      execute the query,
   the executing of the query comprising executing a plurality of read operations,
   the executing of the read operations comprising:
      determining whether the query is time-sensitive; and
      when the query is not time-sensitive, executing the read operations as part of a data retention scan.

2. The solid state drive of claim 1, wherein the determining of whether the query is time-sensitive comprises determining whether the query includes a flag identifying the query as time-sensitive.

3. The solid state drive of claim 1, wherein the executing of the read operations with the data retention scan comprises:
   performing the read operations; and
   when the data retention scan involves performing additional read operations on physical pages not read during read operations corresponding to the query, performing the additional read operations.

4. The solid state drive of claim 1, wherein the controller is configured to:
   receive the query through the host interface; and
   execute the query.

5. A system, comprising:
   a host; and
   a solid state drive,
   the system being configured to:
      receive a query; and
      execute the query
   the executing of the query comprising executing a plurality of read operations,
   the executing of the read operations comprising:
      determining whether the query is time-sensitive; and
      when the query is not time-sensitive, executing the read operations as part of a data retention scan.

6. The system of claim 5, wherein the determining whether the query is time-sensitive comprises determining, by the host, whether the query is time-sensitive.

7. The system of claim 5, wherein the determining whether the query is time-sensitive comprises determining whether the query includes a requested completion interval less than a threshold interval.

8. The system of claim 7, wherein the threshold interval is
   a time interval before a next scheduled data retention scan, plus
   a predicted execution time of the query.

9. A method for operating a solid state drive connected to a host, the solid state drive comprising nonvolatile memory and an environmental data logging circuit and a source of a battery power, the method comprising:
   transitioning the solid state drive to a power save mode;
   receiving, by the host, a query;
   executing, by the solid state drive, a plurality of read operations corresponding to the query,
   the executing of the plurality of read operations comprising:
      determining whether the query is time-sensitive; and
      when the query is not time-sensitive, executing the read operations as part of a data retention scan.

10. The method of claim 9, wherein the determining of whether the query is time-sensitive comprises determining, by the host, whether the query is time-sensitive.

11. The method of claim 9, wherein the determining of whether the query is time-sensitive comprises determining, by the solid state drive, whether the query is time-sensitive.

12. The method of claim 9, wherein the determining of whether the query is time-sensitive comprises determining whether the query includes a flag identifying the query as time-sensitive.

* * * * *